United States Patent [19]

Chappell et al.

[11] 4,258,271

[45] Mar. 24, 1981

[54] POWER CONVERTER AND METHOD

[76] Inventors: Walter L. Chappell; John D. Watts, both of 2836 Delafield, Houston, Tex. 77023

[21] Appl. No.: 936,193

[22] Filed: Aug. 24, 1978

Related U.S. Application Data

[63] Continuation-in-part of Ser. No. 798,648, May 19, 1977, which is a continuation-in-part of Ser. No. 683,734, May 6, 1976, abandoned.

[51] Int. Cl.³ .............................................. F03D 7/00
[52] U.S. Cl. .................................... 290/54; 415/2 R; 415/206; 416/177
[58] Field of Search ...................... 290/43, 44, 54, 55; 415/2, 93, 203, 206; 416/176, 177

[56] References Cited

U.S. PATENT DOCUMENTS

| 852,022 | 4/1907 | Kirschweng | 417/61 |
|---|---|---|---|
| 984,599 | 2/1911 | Pichault | 415/207 |
| 1,345,022 | 6/1920 | Oliver | 415/2 |
| 4,021,135 | 5/1977 | Pederson | 290/55 X |
| 4,079,264 | 3/1978 | Cohen | 415/2 |

FOREIGN PATENT DOCUMENTS 96377  3/1924  Austria ...................................... 415/7

*Primary Examiner*—B. Dobeck
*Attorney, Agent, or Firm*—Guy E. Matthews

[57] ABSTRACT

A method of and apparatus for increasing the power output of an impeller which is mounted in a stream of free flowing fluid, such as water or air. A portion of the free flowing fluid is received by the impeller and some of the portion leaves the impeller and is caused re-enter the free stream at an angle of intersection of not less than 35° but less than 75°. When designed for operation under water, buoyancy chambers are sized and positioned to negate gravitational stresses and distortions when submerged to thereby reduce cost and improve performance.

5 Claims, 10 Drawing Figures

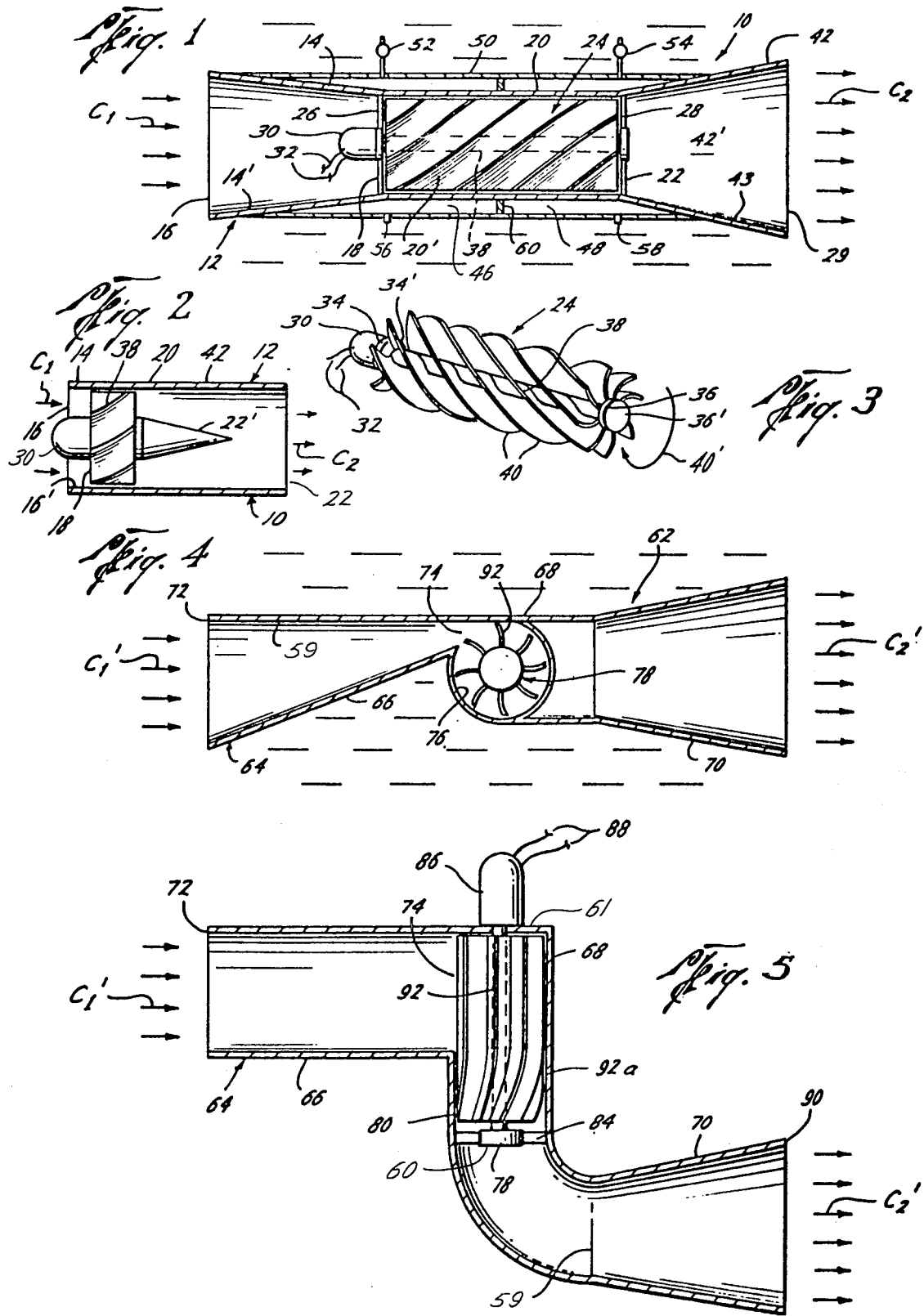

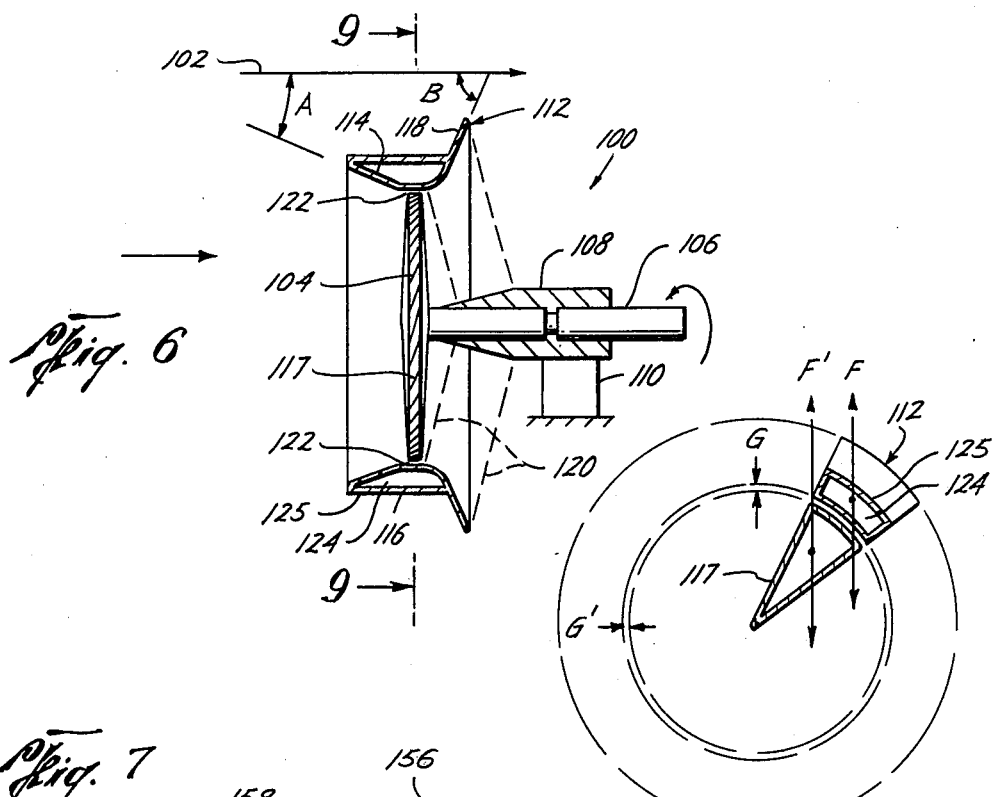
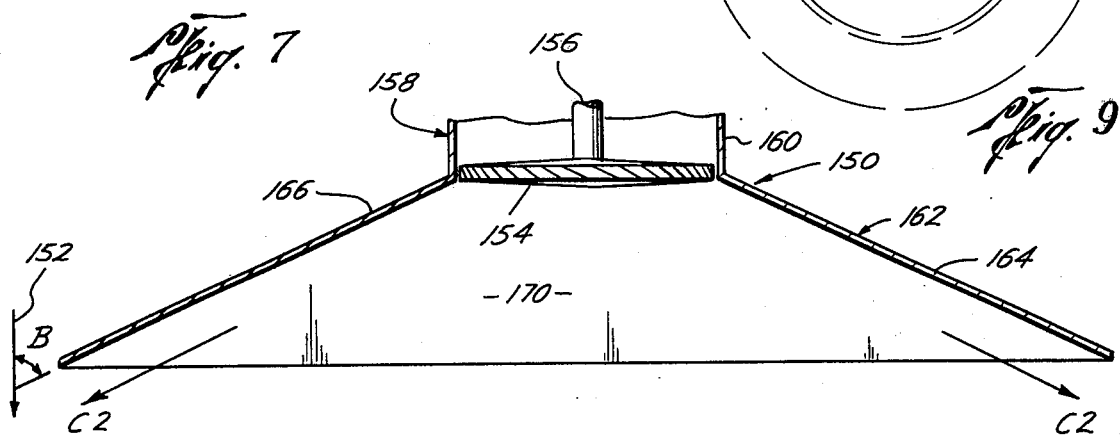
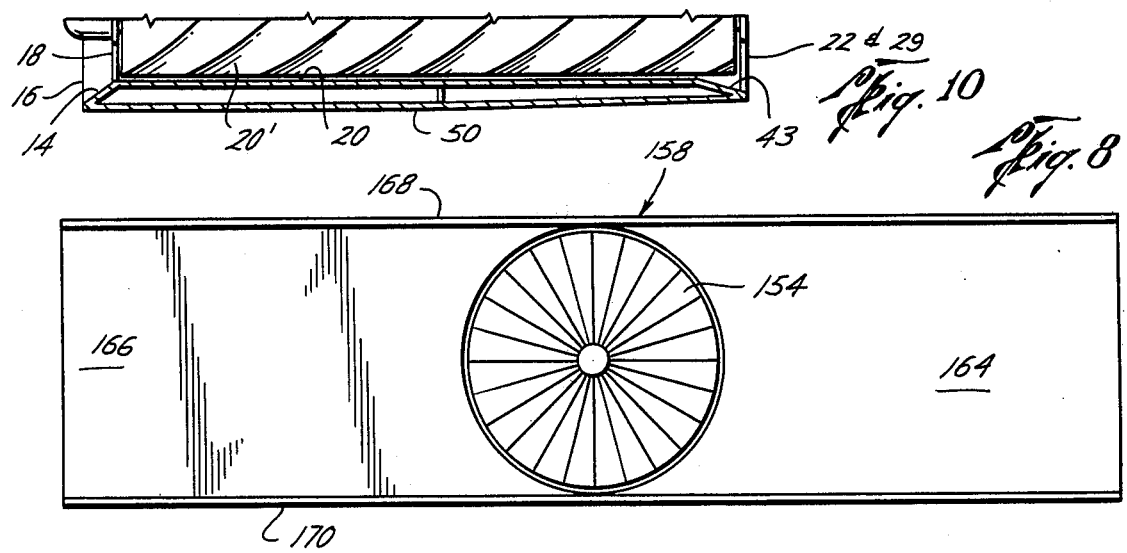

POWER CONVERTER AND METHOD

This application is a continuation-in-part of U.S. Application Ser. No. 798,648, filed May 19, 1977, which is a continuation-in-part of U.S. Application Ser. No. 683,734, now abandoned, filed May 6, 1976.

This invention generally relates to the field of power converters and more specifically to the field of converting power from free flowing fluids, such as wind and water, by positioning a power converting mechanism in free flowing ocean water or other free flowing fluids for the purpose of causing the flowing fluid to drive a power member, thus producing mechanical work and converting the mechanical work into electrical, mechanical, hydraulic or other energy capable of being stored and used.

The present invention is directed to a naturally occuring energy source—free flowing fluids, i.e. ocean currents, river currents and wind, for the purpose of converting the energy available in such streams to a usable power or energy form.

The use of submersible power generators for converting the energy of free flowing deep ocean currents, tidal flows and the like to more usable forms of power such as electricity is known. For example, U.S. Pat. Nos. 2,501,696; 2,820,148; 3,603,804; 2,871,790; 3,064,137; 3,200,255; 3,501,696; 1,393,472; 1,475,170; 3,192,937; 3,870,893; 3,882,320; 3,912,938; 3,898,471; 3,758,788; 3,776,279; 1,148,989; 1,545,633; 3,746,875; 3,774,048; 3,697,764; 3,808,445; 3,783,302; 3,064,137; 3,426,540 and German Pat. No. 883,428 all disclose patents utilizing tides, wave action or water currents for generation of power.

The German Pat. No. 883,428 discloses a windmill with a shroud designed like an airplane wing and providing for wind flowing through the impeller to reenter the wind flowing around the shroud at an angle of intersection of approximately 20°; which is in keeping with past teaching and which will not operate in accord with the present invention.

This invention also teaches how to minimize stress and distortion in large housings and rotors submerged in water so as to reduce costs and improve efficiency; which when compounded with other teachings herein will enhance a cost-effective method and means.

Other and further features and advantages of the present invention, especially as concerns particular features and characteristics thereof, will become apparent to one skilled in the art from the specification, drawings and claims.

The invention further relates to a method of and apparatus for further increasing the power output of an impeller which is mounted in a stream of free flowing fluids. A portion of the free flowing fluid stream is guided and restricted, as with a housing, to impinge on the impeller and impart rotation to a shaft which is mounted with the impeller. After impinging on the impeller, the restricted portion of the stream is returned to intersect the unrestricted portion of the stream at an angle of not less than 35° nor more than 75°.

The present invention, both as to its organization and manner of operation, may best be understood by way of illustration and example of certain preferred embodiments when taken in conjunction with the accompanying drawings in which:

FIG. 1 is a cross-sectional view illustrating one embodiment of the present invention having a housing with a cylindrical power member using spiral or helical vanes or blades;

FIG. 2 is a cross-sectional view illustrating another embodiment having a housing using a cylindrical power member;

FIG. 3 is an elevated view of the power member used in FIG. 1 with spiral or helical blades or vanes and the shaft mounted therewith;

FIG. 4 is a cross-sectional side view illstrating another embodiment having a housing and a power member of spiral or helical blades extending outwardly from a shaft;

FIG. 5 is a top cross-sectional view of FIG. 4, illustrating the position of an inlet and outlet section relative to the power member;

FIG. 6 is a cross-sectional view illustrating the preferred embodiment having an impeller mounted on a shaft;

FIG. 7 is a top cross-sectional view illustrating that the outlet member can be other than cylindrical in shape; and FIG. 8 is an elevational view of the invention illustrated in FIG. 7;

FIG. 9 is a cross-sectional view of the embodiment illustrated in FIG. 6, taken along lines 9—9; and FIG. 10 is a cross-sectional view similar to the embodiment of FIG. 1.

Referring now to the drawings and as illustrated in FIGS. 1 and 2, a submersible power converter is generally indicated by the numeral 10 and includes a housing illustrated generally at 12. The housing 12 has walls which define an inlet section 14, and section 20 mounted downstream of the inlet section and is generally positioned such that flowing fluid, as illustrated by the arrows $C_1$, passes through the sections of the housing 12 wherein such fluid exits from housing 12, as illustrated by the arrows $C_2$.

As illustrated in FIGS. 1 and 2, 4–5, the cross-sectional areas of the outlet openings are greater than the cross-sectional flow areas of the power sections inlet. This construction causes the kinetic energy of flowing water $C_2$ to be less than the kinetic energy of flowing water $C_1$, thereby creating an energy differential across the power member and permitting extraction of power by the power member for conversion by the generating means into usable power.

As illustrated in FIG. 2, walls 16' of housing 12 are generally straight and level from the inlet opening of the inlet section 14 through the outlet opening of the outlet section 42. The cross-sectional area of the outlet opening 22 is greater than the cross-sectional flow area of the power section inlet opening 18. Positioning power generator 30 within the inlet section 14 decreases the cross-sectional area of the inlet opening and inserting a streamline tail cone 22' within the outlet section to form a wall, inhibits turbulance of the flowing fluid while defining a gradually increasing cross-sectional area together with the walls 16' of housing 12.

As illustrated in FIG. 1, the inlet section 14 includes an inlet opening 16, generally tapered sidewalls 14' and power section opening 18. It should be noted, that the opening 16 is larger in diameter than the power section opening 18 so as to direct fluid toward and into said power section. In FIG. 1, the power section 20 includes the opening 18 and outlet opening 22, which opening enables the generator section opening 20' defined by the turbine section walls 20 to communicate with the conduit 42' defined by the tapered side walls 43 of the exhaust section 42.

As illustrated, the power section 20 may be of generally cylindrical configuration or other suitable shapes such as frusto conical and may also include a pair of support members or braces 26 and 28 mounted and suitably attached to the interior of the tapered wall portions 14' and 43, respectively, for supporting a power member generally illustrated at 24 and shown with further clarity in FIG. 3. The power member is suitably mounted at each end 34' and 36' with the support members 26 and 28 respectively for positioning longitudinally with respect to the power section opening 20' and further includes suitable bearing members 34 and 36 mounted with said support members 26 and 28 respectively for the purpose of supporting such power member 24 and to enable its rotation thereof in a manner to be brought out hereinafter.

The power member 24 includes a shaft member 38 and a plurality of helical or spiral vanes or blades 40 which extends helically outwardly from shaft 38 such that when said power member 24 is positioned in housing 12 as illustrated in FIG. 1 in the opening 20' and supported by the cross member 26 and 28, the flowing fluid $C_1$ entering through the opening 18 impinges and contacts the blades 40 to impart rotation in a direction illustrated by the arrows 40' to the blades 40 and shaft 38. Because of the guidance of the current $C_1$ by walls 14'0 entering through the inlet section 14 into opening 20', the rotation of the member 24 is greater than such rotation would be if the member 24 were positioned without such housing 12 in normal water flow.

As further illustrated in FIG. 1, the outlet or exhaust section 42 includes the tapered side walls 43, opening 22 and opening 29 to define the conduit 42'. For the purpose of further enhancing the flow of fluid through the power section 20, the exhaust section 42 is illustrated as being of larger cross-sectional area than the power secction 20. The cross-sectional area of the outlet opening 29 of the exhaust section 42, is larger than the cross-sectional area of the inlet opening 18 of the power section 20. The difference in cross-sectional area causes a kinetic energy drop and pressure recovery in the water flow as it moves through the exhaust section 42. Fluid flowing around outlet 29 intersects fluid $C_2$ and carries it downstream, creating an area of low pressure at the outlet opening 29 thereby allowing fluid to exit the housing, the angle of intersection being in an efficient range as hereinafter described. Because the pressure of the flowing water at opening 18 is greater than the pressure at opening 22, a pressure differential is thereby created across the power section which provides maximum motive power to turn the power member.

As further illustrated in FIGS. 1–3, a suitable generator mechanism 30 is suitably mounted adjacent the bearing member 34 so that rotation of the shaft 38 imparts rotation to the rotatable portion (not shown) of the generator 30 which is well known in the art. While such power generated may be of any suitable type, such as mechanical, hydraulic or electrical, for the purposes of this embodiment, suitable electrical conductors 32 are connected with the generator mechanism 30 and are connected at their other end (not shown) for the purpose of conducting electrical power that is transmitted to desirable locations of use.

FIG. 10 illustrates an embodiment similar to FIG. 1 wherein sections 20 and 42 are combined to produce a power converter more suitable for some installations; however it is to be understood that the invention of FIG. 10 is the same as FIG. 1 except for the combined sections and then the description of the operation of FIG. 1 is suitable for FIG. 10.

As set forth hereinabove, the power converter 10 may be designed for use submerged under water and in view of the fact that such device 10 may be a large structure for generating a large amount of power, several features are desirable. One feature is to facilitate bringing the device 10 to the surface of the water in order that it may be readily repaired and serviced. It is also desirable to offset the distortions and stresses caused by weight of the converter parts themselves by creating buoyancy chambers as necessary to give each portion of each member essentially zero buoyancy when submerged in water. Thus, a round power section remains round rather than being distorted to properly position the power member rotating therein. Further, buoyancy chambers in each power member eliminate radial bearing loads due to weight and therefore allows a higher efficiency of the power converter. It may also, on occasion, be desirable to cause rotation of the power generator 90° in either direction for the purpose of allowing either the shaft 38 and bearings 34 and 36 to be repaired and serviced without requiring repair services to be conducted under water. Accordingly, it is desirable to provide housing 10 with at least one, and preferably more, flotation chambers such as illustrated at 46 and 48. The flotation chambers may be defined by welding or otherwise connecting an outer wall structure 50 to the inlet and exhaust portions 14 and 42, respectively, thereby defining an annulus into which air may be introduced to render power converter 10 buoyant. Air may be introduced through valve devices 52 and 54, if desired, and valves 56 and 58 may be actuated, as desired, to allow interchange of water for ballast.

For the purpose of facilitating rotation of the housing structure to allow the bearings 34 and 36 or generator 30 to be serviced and/or repaired in a non-submerged environment, an internal wall structure 60 may be provided dividing the internal water or air chamber and defining the chamber 46 and 48. Air may then be introduced into one of the chambers 46 or 48 through the respective valves 52 or 54 with one of the valves 56 or 58 open, thereby causing one extremity or the other of the housing structures to become more buoyant. When this occurs, the more buoyant extremity of the housing structure will cause rotation of the generating mechanism to occur. The floating of the generator mechanism on the body of water may be effectively controlled in this manner and servicing operations may be effectively conducted at much less expense than would be required if repair operations were necessitated in a submerged environment. Also, to effect an additional function, the air chambers may be sized and located, on any member of the structure including housings and the power member, so as to minimize stresses and distortions, when submerged in water, caused by weight of the member to thereby reduce its cost and improve its performance. By example, the housing would maintain it roundness to more closely fit the impeller periphery.

Referring now to FIGS. 4 and 5 of the drawings, yet another embodiment of the present invention is illustrated which incorporates a power converter generally illustrated at 62 and includes a rotatable shaft member 78 positioned such that the longitudinal portion of the shaft 78 is normal or transverse to the flow of current $C_1'$ and $C_2'$.

The power generator as illustrated at 62 and in FIGS. 4 and 5 also includes a housing structure illustrated generally at 64 having an inlet section 66, a power section 68 and an exhaust section 70. The inlet section 66 defines an inlet opening 72 having tapered side walls 59 and a power inlet section opening 74 of smaller area than the opening 72.

The power section 68 of the housing structure 64 is constructed to define an internal power compartment 76 for receiving the shaft and blades 78 and 92, respectively, and as further illustrated and explained hereinabove in FIGS. 1, 2 or 10.

The shaft 78 may be supported at one extremity thereof by a bearing member 60 supported by cross member 84 connected to the anterior wall structure 61 of the housing 62 as illustrated in FIG. 5. At the end opposite the cross members 84, the shaft 78 may be journeled or otherwise suitably supported by the anterior wall section 61 such that rotation of the shaft 78 imparts rotation to the rotatable part of the generator mechanism 86 which converts such energy into electrical energy for conduction through the electrical outlets or wires 88 for the purpose of conducting electrical power to any suitable facility for use. Of course, it is to be understood that while FIGS. 4 and 5 disclose the use of the power converter 62 for conversion into electrical energy, that such energy might also be converted into mechanical and hydraulic energy uses.

The exhaust section 70 of the housing structure illustrated in FIGS. 4 and 5 tapers outwardly from the section, not shown to the exhaust opening 90 with such opening 90 being of greater area than the opening 72'. As in FIG. 1 this feature maximizes the power output.

As illustrated in FIG. 5, the inlet opening 72 of the housing structure is not in direct alignment with the exhaust section 70 but, in fact, is offset therefrom such that the power section 68 is positioned transverse to the longitudinal alignment of the inlet section 66 and exhaust section 70.

The offset nature of the housing 62 facilitates utilization of blades 92 that are of two different configurations as illustrated at 92 and 92a, thus, as illustrated in FIG. 5, the helical blades 92 which receive the current $C_1'$ through the opening 74 are straight and not helical and the portion of the blades 92a extending inwardly into and adjacent the opening 80 extend helically outwardly from the shaft 78 such that current flow $C_1'$ imparts rotation to the shaft member 78 and the current flow is then turned at a 90 degree angle and continues to flow toward the opening 80' but due to the helical blades 92a a further rotation is imparted to such shaft because of the relationship between the current flow and the blades 92a maintained at an angle to such current flow adjacent the opening 80. As the current flow enters the opening 72' and passes through exhaust 90 in the direction of the arrows $C_2'$, the flow of fluid through the power section is enhanced due to the fact that the diameter of opening 90 is larger than the diameter of 72', for the same reasons as given for FIG. 1 above.

As illustrated in FIGS. 1 and 10 hereinabove, member 24 has been indicated as being positioned to rotate within housing 12; however it must be understood that shaft 38 could be rigidly affixed within and to housing 12 and converter 10 could be positioned in a flowing current by rotatable attachment to a suitable generator 30 and electrical conduits 32 as set forth hereinabove, to thus enable the total converter 10 to rotate and generate electrical power without the necessity of a stationary housing.

The preferred embodiment 100 of the present invention is shown in FIG. 6 for use in a stream of free flowing fluid, which has a general direction represented by arrow 102. This embodiment includes an impeller or power member 104 capable of being rotated by the free flowing fluid and a shaft 106 mounted with and rotated by impeller 104. Shaft 106 is carried by a bearing housing 108 mounted with frame 110. The rotation of shaft 106 is then used to turn a generator or other apparatus for converting the power in the fluid stream to useful energy or set forth hereinabove.

A housing 112 is mounted around impeller 104 for restricting a portion of the free flowing stream and causing same to impinge on impeller 104. This housing includes a conical shaped inlet section 114 tapering inwardly toward impeller 104 at an angle A preferably 20°, a tubular power section 116 mounted with inlet section 114 extending along the length of impeller 104, and a conical shaped outlet section 118 attached to power section 116 tapering outwardly from impeller 104 at an angle B such angle being the angle of intersection between the fluid leaving the outlet section 118 and the free flowing stream.

As shown in dotted outline 120, housing 112 may be attached to bearing housing 108, allowing impeller 104 to rotate within housing 112 or, as shown in dotted outline 122, housing 112 may be attached to impeller 104 for rotation of the housing 112 with the impeller 104. To obtain optimum effect, the axis of rotation of impeller 104 should be parallel with the general direction of flow of the naturally occuring fluid 102. It has been found that when angle B is held to be not less than 35° but less than 75° the converter of this invention produces a substantial increase in available power from a stream of naturally occuring free flowing fluid. Further, it has been found that holding this angle B, to approximately 65°, the converter of this invention produces an optimum increase in available power from the naturally occuring free flowing fluid. Thus, when the power converter of this invention is mounted in a stream of free flowing fluid, a portion of the stream is directed toward impeller 104, and the fluid impinges on impeller 104 to cause rotation thereof and then returns to the unrestricted stream via outlet section 118 of housing 112.

For purposes described hereinbefore and after, flotation chambers may be sized and positioned in any member as at 124, formed by walls 114, 130, 131 and 125 of the housing. FIG. 9 shows a fragmentary section of FIG. 6 along line 9—9 illustrating that any portion of the housing 112 or the impeller 104 can be made to provide a buoyancy F, equal to its own weight W, so that the weight of a member submerged in water does not create stress in the operating member or between members and therefore the weight of housing 112 would not cause it to become out of round as it would in air, thereby causing the housing 112 not to fit the periphery of power member 104. Likewise, the impeller blades 117 can be made self-buoyant to reduce gravitational stress therein and dimensional distortions thereto. For example, radial gap G, the clearance between the housing 112 and blade 117 at the top (FIG. 9), may equal radial gap G', the clearance between housing 112 and blade 117 at the side (FIG. 9). p Another configuration of outlet section 118 is shown in FIGS. 7 and 8 for use in a stream of free flowing fluid, which has a general direction of flow represented by arrow 152, and includes an impeller or power member 154, capable of being rotated by the free flowing fluid and a shaft 156, which may be mounted similarly to shaft 106 shown in FIG. 6.

A housing 158 is mounted around impeller 154 for restricting a portion of the free flowing stream to impinge on impeller 154. This housing includes an inlet section (not shown), a tubular power section 160 attached to inlet section, and a generally wedge shaped funnel outlet section 162. Outlet section 162 has two generally parallel side walls 168 and 170 and two tapering walls 164 and 166 attached to sidewalls 168 and 170, the taper of walls 164 and 166 being away from impeller 154, as represented by angle B in FIG. 7. As explained for the embodiment shown in FIG. 6, angle B should be not less that 35° but less than 75° and optimunly at approximately 65°.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A submersible apparatus mounted in open flowing streams of water for use in converting the kinetic energy in flowing water into usable power comprising:
    an impeller member moved by the flowing current, said impeller member including a shaft and a plurality of blades mounted with said shaft for enabling the flowing current to strike the blades for rotation of said blades and shaft;
    means mounted with said impeller member for converting the movement of said impeller member into electrical or other desirable power;
    a housing mounted around and adjacent said impeller member, said housing having an inlet section and outlet section and a body section connecting said inlet and outlet sections and wherein said inlet section is positioned to receive into the impeller substantially all flowing current entering said housing such that the flowing current substantially enters the inlet section free of any restriction such that the current entering the inlet section and the unrestricted flowing current immediately adjacent the outside said inlet section are flowing substantially in a parallel direction and wherein the flowing current outside the inlet section and body section is substantially unrestricted such that the unrestricted flowing current outside said housing and adjacent said inlet and said body section is deflected by an inclined outwardly radially extending wall of said exit section, said wall being at an angle of not less than 35° nor more than 75° relative to the longitudinal axis of said body section such that the previously unobstructed free flowing stream is deflected outwardly away from said body section and said exit section and allowing only the current flowing into the impeller to rejoin the unrestricted flowing current outside said inlet section immediately downstream of said deflection.

2. The structure as set forth in claim 1 wherein the area inscribed by the periphery of said exit section of said housing is greater than the cross-sectional area of fluid flow around said impeller member.

3. The structure as set forth in claim 1 wherein the free flowing stream outside said housing is deflected outwardly by said exit section between 35° and 75° relative to the longitudinal axis of said housing immediately before the fluid that has passed through said impeller member rejoins the stream flowing outside said housing.

4. A method of converting kinetic energy from a natural, open flowing stream of water into useful energy comprising the steps of:
    submerging an impeller mounted with energy transmission means in said stream;
    restricting an unobstructed first portion of the stream to flow through the impeller causing it to move and deliver energy to said transmission means;
    deflecting an unrestricted and previously unobstructed section portion of the stream flowing substantially parallel to the restricted first portion, outwardly from said first portion at an angle not less than 35° nor more than 75° as measured from the stream direction; and
    allowing only the first portion to rejoin the second portion immediately downstream of said deflection.

5. An apparatus for converting kinetic energy from a natural open flowing stream of water into useful energy comprising:
    an impeller to convert kinetic energy of the flowing stream into mechanical energy, mounted with means to transmit energy from the impeller to its point of use;
    means to restrict a previously unobstructed first portion of the stream to flow through the impeller causing it to move and deliver energy to said transmission means;
    means to deflect an unrestricted and previously unobstructed second portion of the stream flowing substantially parallel to the restricted first portion, outwardly from said first portion at an angle not less than 35° nor more than 75° as measured from the stream direction; and
    means allowing only the first portion to rejoin the second portion immediately downstream of said deflection.

* * * * *